US006255980B1

(12) United States Patent
Matthews

(10) Patent No.: US 6,255,980 B1
(45) Date of Patent: Jul. 3, 2001

(54) RADAR-ACOUSTIC HYBRID DETECTION SYSTEM FOR RAPID DETECTION AND CLASSIFICATION OF SUBMERGED STATIONARY ARTICLES

(75) Inventor: Anthony D. Matthews, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/443,190

(22) Filed: Nov. 12, 1999

(51) Int. Cl.[7] .......................... G01S 13/88; G01S 13/86; G01V 3/12
(52) U.S. Cl. .............................. 342/22; 342/25; 342/52; 342/58
(58) Field of Search ................................. 342/22, 25, 27, 342/28, 52, 58, 90, 189, 190, 191, 192, 193, 194, 195, 196, 197

(56) References Cited

U.S. PATENT DOCUMENTS

| 4,229,809 | * | 10/1980 | Schwalbe | 367/6 |
| 4,891,762 | * | 1/1990 | Chotiros | 701/223 |
| 5,481,504 | * | 1/1996 | Rosenbach et al. | 367/101 |
| 5,579,285 | * | 11/1996 | Hubert | 367/133 |
| 5,729,694 | * | 3/1998 | Holzrichter et al. | 705/17 |
| 6,130,641 | * | 10/2000 | Kraeutner et al. | 342/179 |
| 6,147,636 | * | 11/2000 | Gershenson | 342/22 |

FOREIGN PATENT DOCUMENTS

| 4229809 | * | 12/1987 | (EP) . |
| 11311671 | * | 11/1999 | (JP) . |

* cited by examiner

Primary Examiner—John B. Sotomayor
(74) Attorney, Agent, or Firm—Harvey A. Gilbert; Donald G. Peck

(57) ABSTRACT

A region of water is insonifed with a series of pulses. A synthetic apeture radar (SAR) is flown about the region and images the water surface above the sonified area. The radar has a carrier frequency ($F_r$) the acoustic source has a nominal carrier frequency of $F_a$. This acoustic frequency $F_a$ is selected such that the acoustic wavelength is nearly, or exactly, half the wavelength of the radar carrier $F_r$ where modified by the Sine of the incident of angle. Also practical are those acoustic wavelengths that are integer multiples of the wavelength that is half the radar wavelength. This arrangement will result in the Bragg condition in portions of the radar image of the water surface. The pulse repetition frequency (PRF) of the radar and the acoustic sources are equal (or can be such that the acoustic PRF is an integer multiple of the radar PRF), and locked in phase together by a radio frequency link between the SAR and the sonar transmitter. The sonar signal is repeatable and coherent with the radar signal. As a result, the SAR image can be processed, eliminating random surface wave motion, to detect and classify the structures that underlie the water surface.

16 Claims, 3 Drawing Sheets

RADAR-ACOUSTIC HYBRID DETECTION SYSTEM FOR RAPID DETECTION AND CLASSIFICATION OF SUBMERGED STATIONARY ARTICLES

FIELD OF THE INVENTION

The present invention relates generally to the field of underwater detection of articles. In particular, the present invention is directed to a hybrid radar-acoustic system in which acoustic echoes caused by the presence of a stationary underwater object are identified by a radar detection system coordinated with the acoustic system.

BACKGROUND OF THE INVENTION

Traditional methods for detecting submerged objects include sonars towed through the water and, in recent years, synthetic aperture radar (SAR). The SAR works by imaging the water surface while a current flows such that wind creates capillary waves over regions of shallow water. Since the water moves at speeds that vary according to depth, and the wind-caused by the capillary waves vary according to water speed, and the radar return from a patch of water is higher for a region occupied by capillary waves than for a region of comparatively smooth water, the SAR can reveal bathymerty. Attempts to harness this technique for discovery of smaller objects, such as sea mines, have yielded disappointing performance. Experimental systems that use lasers to read acoustic signals from the water surface have been demonstrated in recent years. They have shown promise, but suffer from the fact that the laser beam is very narrow, and can be deflected from the receiver by small waves on the water surface. A solution to this signal loss has been elusive, and without it, the system development probably will not proceed.

Sometimes conventional technology incorporates a sonar system used to create wave patterns indicative of the presence of the objects. The current search systems use tethered sonar transmitters which are placed in the water to emit acoustic waves that will be modified when striking underwater objects. These are awkward to deploy and control. This is especially true since the system also includes a laser and detector mounted on an airplane for reading wave patterns that are indicative of underwater objects. In the alternative, magnetic detectors can be used rather than laser detectors.

Unfortunately, both types of conventional detection systems have relatively low search rates, and are often defeated by turbid waters. When using a laser system there are often significant degradation caused by surface waves, as well as other environmental conditions.

The use of synthetic aperture radar (SAR) has been considered for the detection of underwater mines. However, this use of SAR has been considered impractical within the limits of the conventional art, which relies upon the use of DC current passing over the underwater targets, while the SAR is used to find the resulting indications of the underwater object. High speed mine detection and other applications requiring both high speeds and precision have proven inappropriate for conventional uses of SAR, along with traditional liquid agitation techniques.

Much underwater detection, such as bottom-mapping, does not require great resolution, so that conventional systems are still quite suitable. However, there are other applications, such as underwater rescue, mine detection and submarine detection that require a systems capable of rapidly scanning and analyzing indicia signals indicative of underwater objects. Speed is especially critical in combat or emergency situations. Therefore, there is a need for an underwater detection system that avoids the relatively slow operation of conventional systems, while still maintaining high degrees of sensitivity and accuracy.

SUMMARY OF THE INVENTION

Accordingly, it is one object of the present invention to overcome the various limitations of the conventional art.

It is another object of the present invention to provide an underwater detection system capable of rapid scanning to accommodate combat conditions, or other emergency situations.

It is another object of the present invention to provide an underwater communication system including underwater acoustic communications links.

It is still a further object of the present invention to provide an underwater detection system capable of accuracy even in turbulent waters.

It is again another object of the present invention to provide an underwater detection system capable of examining large expanses of water without extensive expenditures of time.

It is yet a further object of the present invention to provide an underwater detection system that can utilize existing subsystems such as conventional sonar and SAR units.

It is still an additional object of the present invention to provide an underwater detection system that does not rely upon wind to create capillary patterns for the identification of underwater objects.

These and other goals and objects of the present invention are achieved by a detection system arranged to detect an object under the surface of a liquid medium. The system includes at least one acoustic generator arranged for generating a detectable pattern of waves on the surface of the liquid medium. The acoustic generator operates at a frequency range where the detectable pattern of waves will have reinforcing characteristics at selected observation angles. The system also includes at least one radar device arranged to scan the detectable pattern of waves on the surface of the liquid medium. The radar scanner includes circuitry for coherently adding multiple scans of the detectable pattern of waves. The detection system further includes a linking mechanism for coordinating transmittal of the radar device and the acoustic generator by phase-locking both radar and acoustic transmissions.

Another embodiment of the present invention includes a method of detecting an object under the surface of a liquid medium. The method includes the first step of generating acoustic signals in the liquid medium at a selected frequency range to form wave patterns on the surface of liquid medium. As a result the particular wave patterns will have reinforcing characteristics at predetermined angles of observation. The particular wave patterns will be scanned by radar which is in a phase-locked relationship with the generation of the acoustic signals to detect signals indicative of the particular wave signals at selected observation angles. The detected signals will then be coherently added for at least one selected observation angle to obtain an indication of the object to be detected.

DETAILED DESCRIPTION OF THE PREFERRED EMBODIMENTS

Figure 1:
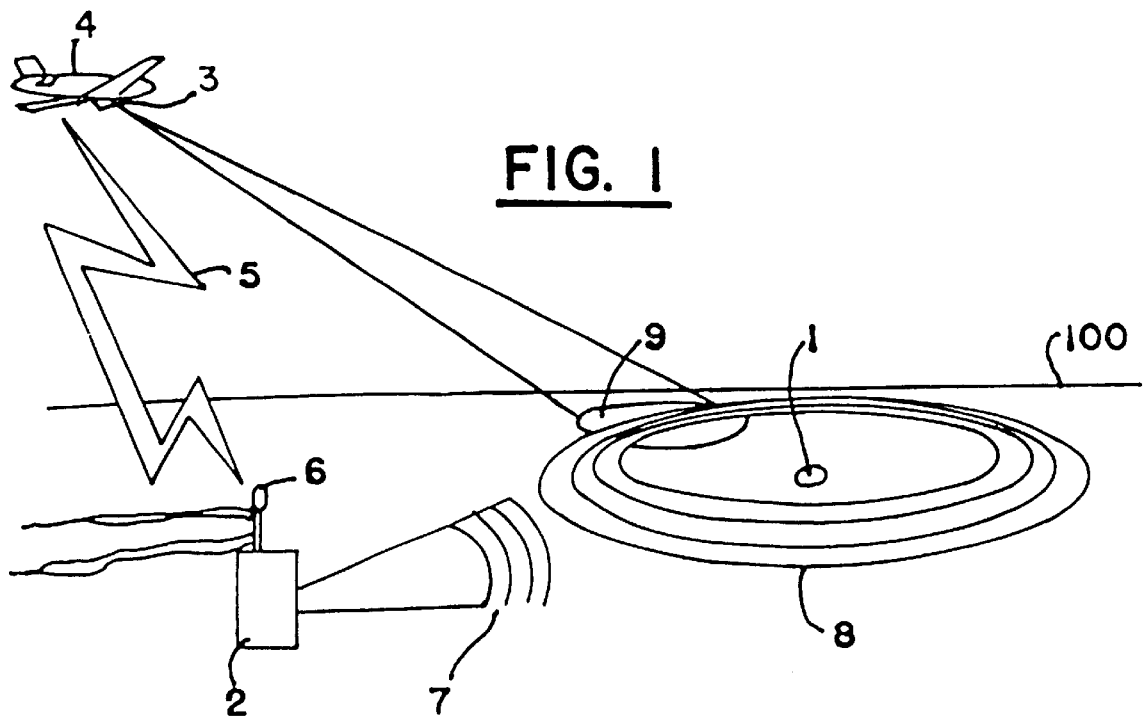
FIG. 1 is a schematic depicting the radar acoustic hybrid system.

The inventive radar-acoustic hybrid system used for underwater detection is depicted in FIG. 1. The system is designed to search for an object 1, which can be lying at the bottom of the liquid medium 100, floating near its surface, or located on any point therebetween. Object 1 can be small or located in turbid waters. Nonetheless, the system of the present invention has the capability of detecting the object and generating sufficient data to clearly identify, or even provide an image of the object to be detected.

At least one acoustic generator 2 must be located within the liquid medium 100 to generate acoustic waves 7 that are reflected from object 1. In the preferred embodiment of the present invention the acoustic generator 2 is a sonar unit. In large search areas more than one sonar unit would be deployed. If the radar operates in a band between 94.5 GHz, the acoustic operating frequencies include: 671.75 kHz for bright return, and 447.8 kHz for dark return. Other preferred acoustic frequencies for bright return are: 335.8 kHz; 223.9 kHz; and, 167.9 kHz. For dark return, other frequencies include 268.7 kHz; 191.9 kHz; 149.3 kHz; and, 122.1 kHz. The use of bright return detection and dark return detection are equally conducive to the operation of the present invention, in the same manner they are used in conventional underwater detection systems as high and low points in a waveform that indicated a time varying pressure field.

Figure 2:
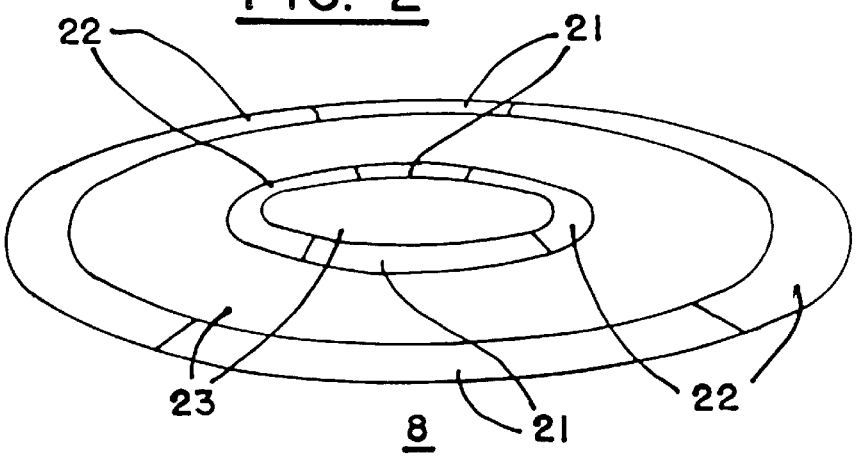
FIG. 2 is a schematic depicting an idealized wave pattern generated by the radar acoustic hybrid system of the present invention.

The combination of transmitted acoustic waves 7 and acoustic waves reflected from object 1 form a pattern of waves 8. Preferably, this pattern is constituted by a series of waves and resolves itself as depicted in FIG. 2. There will be areas of high intensity 21 (due to constructive interference according to the Bragg Scattering), medium intensity 22 and low intensity 23 when and where the resolution cell is subtended by waves that create destructive interference.

The wave patterns 8 are impressed on the water surface, and are composed of the constructive waves in some regions, and destructive waves in others. The picture elements of the processed SAR images are sometimes called pixels. Each pixel represents the reflectivity of a resolution cell on the surface examined by the SAR 3. Those cells occupied by the constructive waves will appear bright. Those cells occupied by the destructive waves will appear dark. Thus the image will bear the signature for any source of echoes according to the pattern of constructive and destructive pulses sent out by the acoustic generator.

SAR 3 has the property that many transmissions are made over a range of observation angles to produce the estimate of reflectivity in each resolution cell. This means that each cell is an average of thousands of measurements, though they are taken in several tens of seconds by a passing platform 4 (usually an aircraft carrying the radar). One aspect of this invention is the arrangement of acoustic surface expressions of a small height, to be repeated in the same spatial locations for each SAR observation of each cell. Within each cell then, the small acoustic waves will be averaged thousands of times. Their coherent addition will increase as the number of observations rises to that required aperture synthesis. The random waves from nature, though large for an individual observation, will average to a diminishing level as the number of observations rises. At some number of observations, the coherent sum of the small coherent waves will exceed the coherent sum of the large non-coherent natural waves. Thus the echo centers in the observation field will be discovered int eh processed SAR imagery as concentric circircles of bright and dark pixels.

Included with the SAR 3 is a common trigger 5, which controls the transmission of both the SAR and the acoustic generator 2. The trigger link 5 is preferably a radio frequency link from a transmitter (not shown) at the SAR site and a radio frequency receiver 6 located at the acoustic generator 2. The radio equipment used to effect common trigger links is conventional in nature, and so requires no further elaboration for purposes of enabling the present invention.

For the common trigger RF link 5 to operate, it is clear that a portion of acoustic generator 2 must be above the surface of liquid medium 100. However, the acoustic generator 2 does not have to be tethered to the SAR source (such as airplane 4) as is commonly done with conventional systems. This allows the advantage of easier deployment of the acoustic generators, the use of large numbers of such generators, and greater flexability in the scanning pattern permitted to the SAR 3 in airplane 4. The result is an arrangement that facilitates quick deployment of acoustic generator 2, and fast scanning of the areas subjected to acoustic radiation 7. This embodiment including a radio frequency link does not preclude the use of other means to effect the common trigger. It could be easily accomplished with a Laser or Maser.

Because of the aforementioned characteristics the present invention is far more appropriate for emergency or combat situations than are conventional underwater detection systems. Further, it should be noted that an airplane 4 is not needed to support SAR 3. Rather, a helicopter can be used, as can any hovering vehicle such as a hydroplane. Also, the SAR can be mounted on the tower of a tall ship. The only limitation is range of the angles of depression that are available with any particular support platform. Preferably, with the present invention depression angles of between 30 degrees and 60 degrees will be available for scanning with the SAR. However, other angles between 0 degrees and 90 degrees are also useful.

Figure 6:
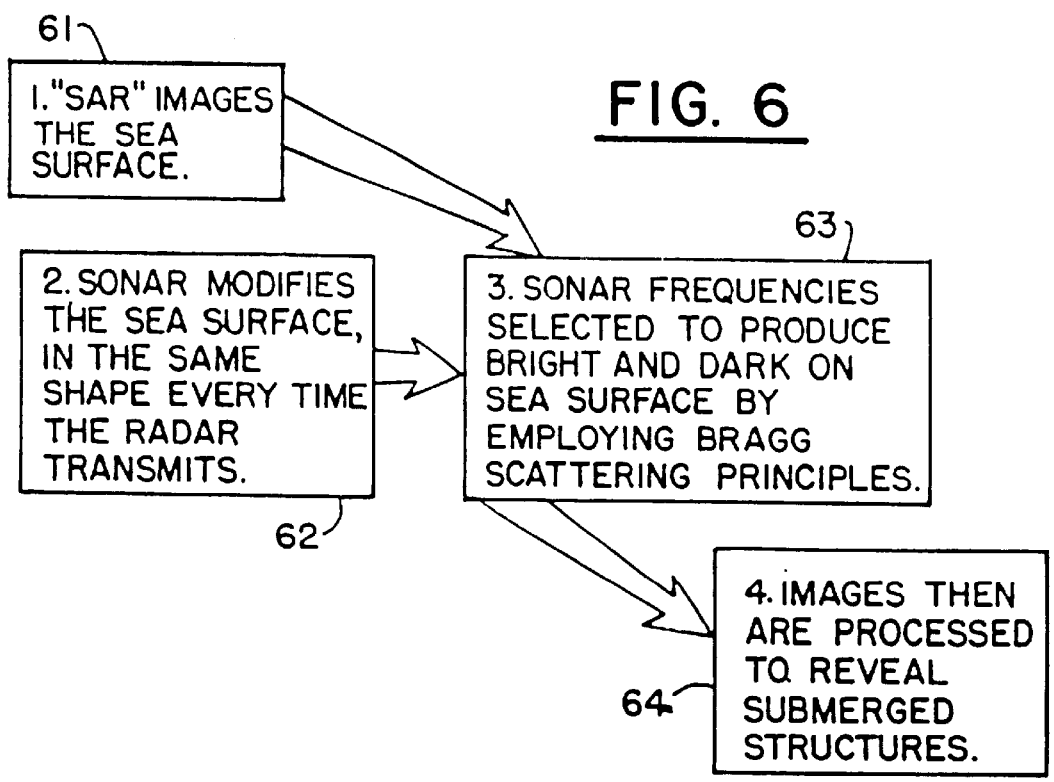
FIG. 6 is a block diagram depicting the operation of the radar-acoustic hybrid system.

The operation of the present invention is best depicted by the flow diagram of FIG. 6. The process begins at step 61 where the SAR 3 scans the surface of liquid medium 100. At step 62 acoustic (preferably sonar) generator 2 modifies the liquid surface to create a particular pattern each time that the SAR 3 transmits. In particular, the transmission of the SAR controls the transmission of acoustic generator 2 (or any number of different acoustic generators that are deployed) in a phase-locked arrangement via radio frequency of link 5. By this expedient the SAR and sonar operate in phase with each other to enable the detection process.

The sonar frequency is preferably produced by acoustic generator 2 to create a pattern of light and dark waves on the surface of liquid medium 100. This pattern is independent of the capillary action conventionally used to detect objects under the water. The present invention is also independent of the random turbulence that limits conventional detection systems. It is a requirement of the present invention that the pattern of waves 8 created on the surface of medium 100 have characteristics so that part of the pattern includes reinforced characteristics (constructive interference) at certain angles of observation. A Bragg scattering pattern is the preferred example of the standing wave pattern that is utilized as part of the present invention. At step 63 the pattern is scanned, preferably 40,000 to 50,000 times in the course of one pass for each resolution cell (usually the size of a single pixel). The scanned data is coherently added for observation angles at which constructive interference is detected (based upon a common phase relationship). As a result, the presence and characteristics of object 1 are displayed, as indicated at step 64.

Each of the components of the present invention, SAR 3, sonar generator 2 and radio link 5 are all constituted by standard components and subsystems, already well-known in underwater detection technology. The key attributes of the present invention reside in the relationships between the SAR (or other types of radar) 3 and the sonar generator 2. The phase lock between the two (effected through RF link 5) is only part of the coordinating operation between the SAR 3 and the sonar 2. There are also crucial relationships between the wave pattern 8 generated by the sonar and the scanning operation of the SAR 3. This relationship is facilitated by the particular type of wave pattern 8 generated by sonar 2.

In one preferred embodiment a Bragg scattering pattern is used. The Bragg condition is satisfied when the repeating acoustic wave pattern has a wavelength equal to half that of the incident radar wavelength, as modified by the angle of incidence for the scanning radar. The standard definition for Bragg scattering as applied at the molecular level also applies to the sonar acoustic waves at the frequencies specified infra.

The constructive interference characteristic of Bragg scattering is necessary since the peak vibration amplitude of an acoustic wave at the surface of liquid medium 100 is approximately $10^{-8}$ meters. This size wave is normally invisible to human sight so that some type of additive operation is necessary. This additive operation is achieved by the normal formation of a SAR image and the common trigger for sonar and SAR. In addition to this characteristic, a coherent addition function is carried out at the SAR 3 to provide definite information regarding any objects 1 that may have altered wave pattern 8.

The phase of the SAR 3 is locked to that of acoustic generator 2 so that the SAR and the acoustic waves detected have the same phase relation during the SAR passage over the area insonified by the sonar. The pulse repetition frequency (PRF) of SAR 3 and the acoustic sources 2 are equal. This relates the phase of the SAR to that of the sonar. The sonar and the SAR are phased together by radio frequency link 5. It is permissible, and often convenient, for the acoustic PFR to be an integer multiple of the SAR PFR.

Also, there is a relationship between the frequencies of the SAR 3 and sonar generator 2. For detection of object 1 based upon bright return (peaks in SAR image) the following relationship between the acoustic wavelengths and the radar wavelengths apply $$\lambda r = 2\lambda a \cos \theta.$$

where $\lambda r$ is radar wavelength, $\lambda a$ is acoustic wavelength, and $\theta$ is the radar depression or observation angle. Depression angle is here defined by the vertical angle between horizontal and the SAR main response axis (MRA).

For detection based upon dark return (in the SAR image) the following relationship between acoustic wavelength and radar wavelength will apply:

$$\lambda a = n\lambda r / (4 \cos \theta).$$

where n is any positive, odd integer.

A typical operating frequency for SAR 3 is 95 GHz with a 1 GHz bandwidth. This operates in conjunction with the acoustic frequencies specified supra: 671.75 kHz, 335.8 kHz, 223.9 kHz, 167.9 kHz (all for bright return); and, 447.8 kHz, 268.7 kHz, 191.9 kHz, 149.3 kHz, and 122.1 kHz (all for dark return). The preferred range of scanning angles for the radar 3 is between 30° and 60°. However, angles between 10° and 80° are useful but with less desirable operation characteristics.

The aforementioned wavelength of the radar 3 is selected to satisfy the Bragg scattering condition (as modified by the angle of incidence). The coherent addition of the multiple scans of any given resolution cell (1 pixel) of the surface of liquid medium will erase the effects of the random surface waves when looking at a static phenomenon (such as that caused by an object in the water). The aforementioned sonar frequencies are selected to interact near a common resonance with object 1 being sought to produce powerful echoes in the medium channels (water) available. The channel in the preferred embodiment includes the water column defined by the waves around object 1, the water surface and the air through which the radar 3 propagates. Because of this relationship, the present invention suffers from little degradation due to the environmental factors.

Operation of SAR is well understood. In the interest of clarity, some basics are stated, as they are specifically applied to this invention. The SAR makes a single pass over a region to be imaged. The SAR transmits a broad beam with PRF that is in the range of 100 to 2,000 times per second. This illuminates a resolution cell, on the surface below, thousands of times in the course of a single pass. This iterative illumination when sensed by a coherent system, offers the benefit provided by this invention.

The coherent addition of detected signals of wave pattern 8 is accomplished if each illumination of the area 9 contains the same wave pattern. This can be accomplished by repeating the wave pattern read by each subsequent radar transmission. Coherent addition of each cell, with a repeated wave structure (acoustically imposed and spatially identical) will average toward an increasingly powerful version of the structure. This acts to average the large natural waves into a flat image (all cells approach a common reflection coefficient).

Figure 3:
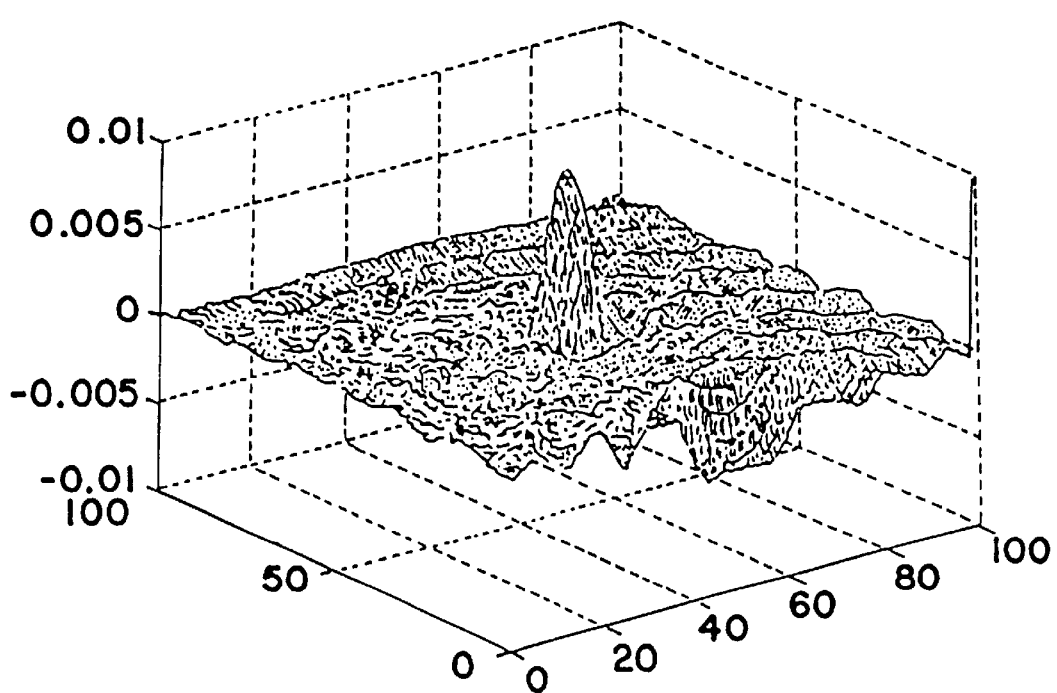
FIG. 3 is a graph depicting incident and echo sonar waves over an area of water surface.
Figure 4:
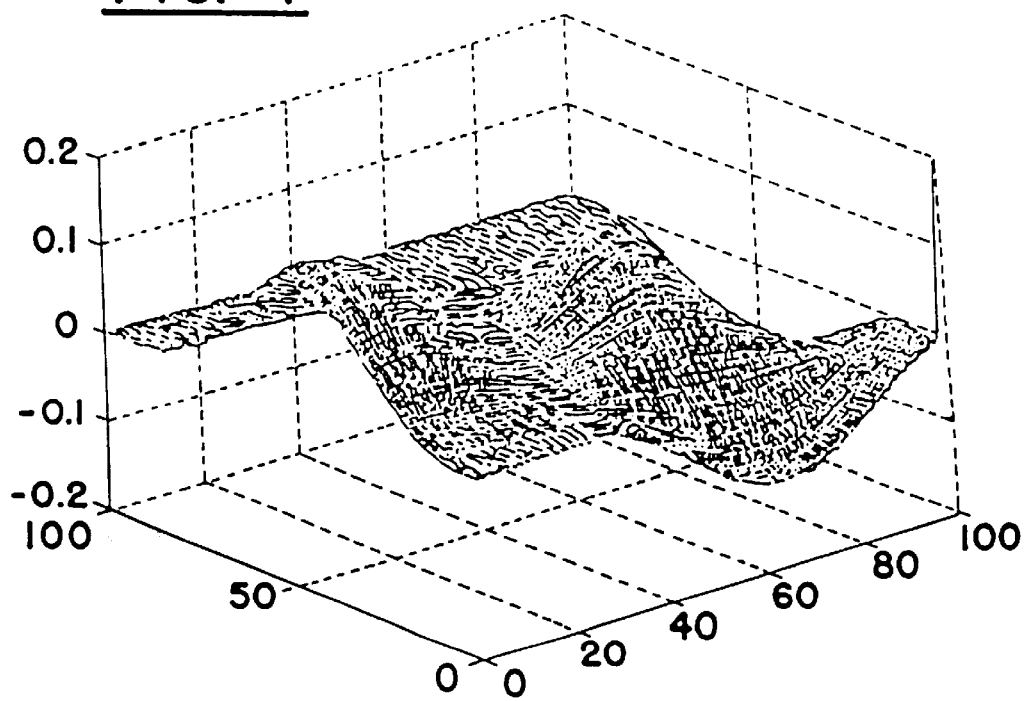
FIG. 4 is a graph depicting the effects of random waves that have been added to the sonar waves of FIG. 3.
Figure 5:
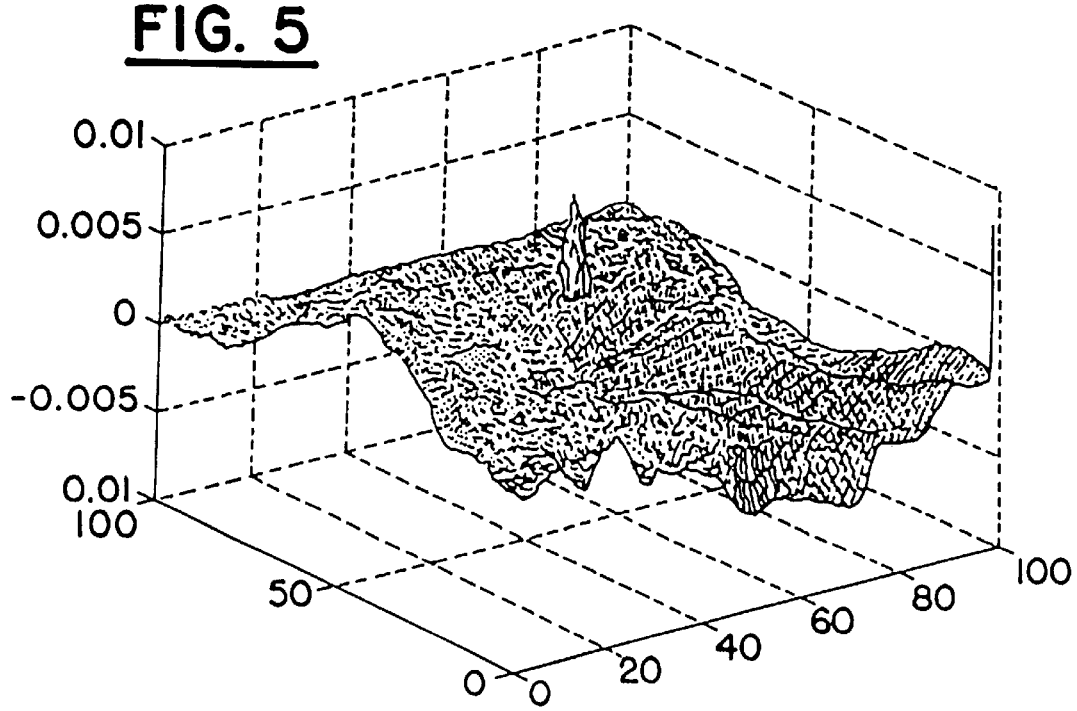
FIG. 5 is a graph depicting coherent addition of sonar waves in conjunction with the addition of random waves over an area of water surface.

This process is illustrated in FIGS. 3–5. FIG. 3 depicts an exaggerated surface of an incident sonar continuous wave and artificially enlarged echo from a single scattering center below the surface. The object to be detected would probably be composed of many scattering centers. The echo is depicted by the entire wave pattern on the surface of the field. Signals at the water's surface include both incident and echo sonar waves together. The vertical displacements are in the range of $10_{-8}$ meters and are exaggerated in the drawings for the sake of a clear illustration.

FIG. 4 depicts random surface waves, such as those caused by normal turbulence on the surface of any body of water. These waves are approximately 40 times the height of the sonar waves depicted in FIG. 3. In FIG. 4 the large random waves have been added to the small field depicted in FIG. 3, with the result that the random surface waves entirely overwhelm the sonar waves of FIG. 3.

FIG. 5 depicts the combination of random waves with the result of coherent addition of 46,000 sonar waves images (as depicted in FIG. 3). The relative depletion of the random surface waves with respect to the coherently added sonar waves is exaggerated in FIG. 5. However, FIG. 5 is indicative of the fact that random noise can be canceled while the sonar signals can be amplified to a sufficient extent that object 1 can be detected and it's characteristics identified. This capability is facilitated by the phase locking between the SAR 3 and the acoustic generator 2, the selected acoustic frequencies facilitating Bragg scattering, and the specific relationship between the frequency of the radar and that of the acoustic generators as defined supra.

While the relationship between the radar frequencies and the acoustic frequencies must be as defined supra, there is a great deal of variability in the SAR 3 imaging process. Preferably, the SAR image will be processed for full polarization. This includes, horizontally illuminated, horizontally sensed; vertically illuminated, vertically sensed; horizontally illuminated, vertically sensed; and vertically illuminated, horizontally sensed. There will be medium returns for radar sensing for those resolution cells (pixels) defined at the water surface that do not contain a sonar pulse provided by generator 2. Returns from those resolution cells containing destructive wave patterns will be low (dark). Returns from cells containing constructive wave patterns will be high (bright). Of course, the detection of any returns caused by Bragg scattering depend upon the angle of incidence (observation angle) at which the radar scan occurs, and this angle will be controlled to produce the desired effects.

It is also possible to utilize the Doppler associated with the approaching and retreating parts of the echo on either side of the sources. This will create a single match (from the radar perspective) at either the approaching side of the circular echo or the retrieving side of the echo, as depicted in FIG. 2. Normally, the acoustic waves travel at about 1,500 meters per second. This will allow a Doppler shift for a 95 GHz radar signal of about 1,013 MHz upwards when the wave intersects the water surface between the target and the radar. This shift will be downward when the intersection of the acoustic pulse and water surface is further from the radar than the source of the acoustic waves. The radar has sufficient bandwidth, for example in the 94.5 to 95.5 GHz band, for the system of the present invention to accommodate both the upward and downward Doppler shift. However, half the bandwidth must be greater than the overall Doppler shift for the processing to be carried out properly and the coherent addition of the radar returns to contain the proper information. Preferably, the radar should have a bandwidth slightly larger than twice the anticipated Doppler for reasonable operation. One example is a 1 GHz bandwidth.

Although a number of embodiments and variations of the present invention have been offered by way of example, the present invention is not limited thereby. Rather, the present invention should be interpreted to include any and all variations, permutations, adaptations, and embodiments that would occur to one skilled in underwater detection, who has been taught the present invention by the instant application. Accordingly, the present invention should be construed as being limited only by the following claims.

I claim:

1. A detection system arranged to detect an object under the surface of a liquid medium, comprising:
   (a) at least one acoustic generator arranged for generating a detectable pattern of waves on the surface of said liquid medium, said at least one acoustic generator operating at a frequency range whereby said detectable pattern of waves has reinforcing characteristics at selected observation angles;
   (b) at least one radar device arranged to scan said detectable pattern of waves on said surface of said liquid medium, said at least one radar device comprising means for coherently adding multiple scans of said detectable pattern of waves; and,
   (c) link means for coordinating transmittal of said at least one radar device and said at least one acoustic generator by phase-locking radar and acoustic transmissions.

2. The detection system of claim 1, wherein said at least one acoustic generator is tuned to a frequency range which is related by a specific relationship to a selected wavelength of said at least one radar device.

3. The detection system of claim 2, wherein said at least one radar scanner is tuned to achieve a predetermined relationship with frequencies generated by said at least one acoustic generator.

4. The detection system of claim 3, wherein said specific relationship is Bragg's Law.

5. The detection system of claim 3, wherein said at least one radar device comprises means for scanning said detectable pattern of waves at multiple observation angles.

6. The detection system of claim 5, wherein said at least one radar device is mounted in an airplane and physically separated from said at least one acoustic generator.

7. The detection system of claim 3, wherein radar wavelength is twice the acoustic wavelength modified by the cosine of a selected observation angle.

8. The detection system of claim 7, wherein said observation angles are between 0 degrees to 90 degrees.

9. The detection system of claim 1, wherein said link means comprise a radio frequency link between said at least one radar device and said at least one acoustic generator.

10. The detection system of claim 9, wherein said at least one radar device is a synthetic aperture radar (SAR) system operating at 95 GHz, and said at least one acoustic generator operates at frequencies from approximately 672 kHz to 122 kHz.

11. A method of detecting an object under the surface of a liquid medium, comprising the steps of:
   (a) generating acoustic signals in said liquid medium at a selected frequency range to form particular wave patterns on said surface of said liquid medium, whereby said particular wave patterns have reinforcing characteristics at predetermined angles of observation;
   (b) radar scanning said particular wave patterns in a phase-locked relationship with generation of said acoustic signals to detect signals indicative of said particular wave patterns at selected observation angles; and,
   (c) coherently adding said signals at at least one selected observation angle to obtain an indication of said object.

12. The method of claim 11, wherein between substantially 40,000 and 50,000 scans of a selected portion of said liquid medium are carried out.

13. The method of claim 12, wherein said radar scanning is carried out at observation angles of between 30° and 60°.

14. The method of claim 13, wherein radar signals have twice the wavelength of acoustic signals as modified by the cosine of a predetermined angle of observation.

15. The method of claim 14, wherein said step of radar scanning takes place at 95 GHz with a 1 GHz bandwidth.

16. The method of claim 11, wherein said step of generating acoustic signals and said step of radar scanning are controlled to take place in synchronization with each other.

* * * * *